United States Patent Office 3,581,354
Patented June 1, 1971

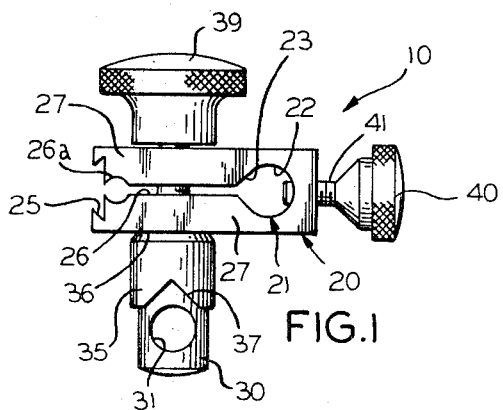
FIG.1
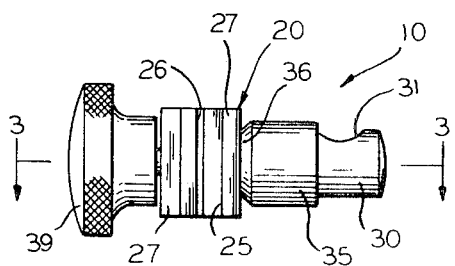
FIG.2
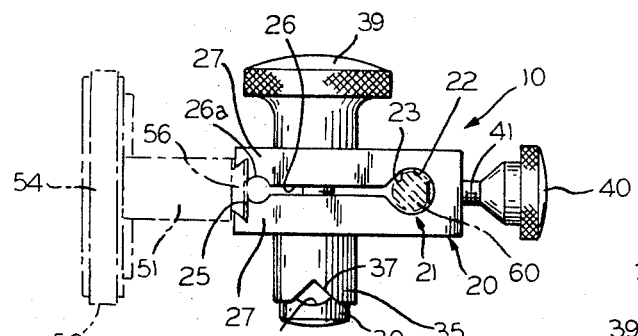
FIG.4   FIG.3
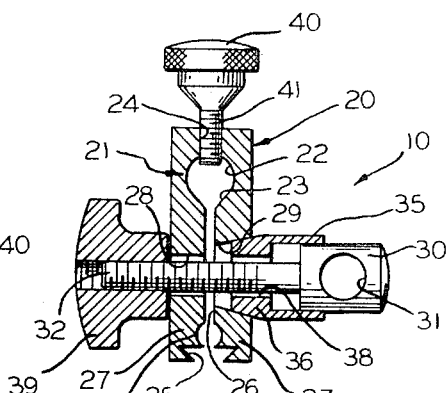
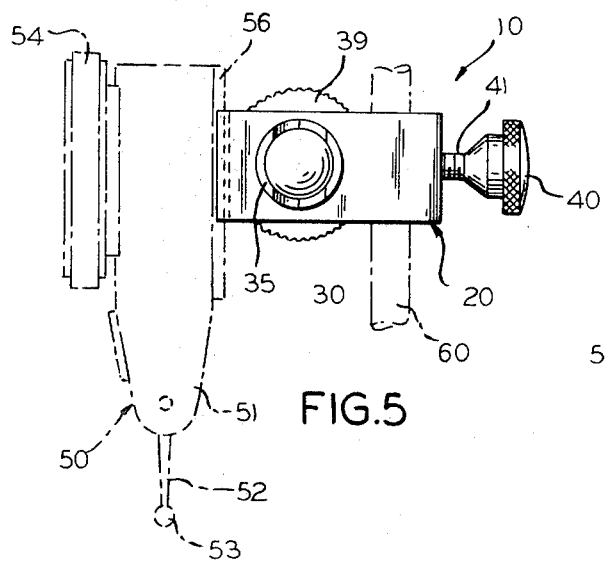
FIG.5
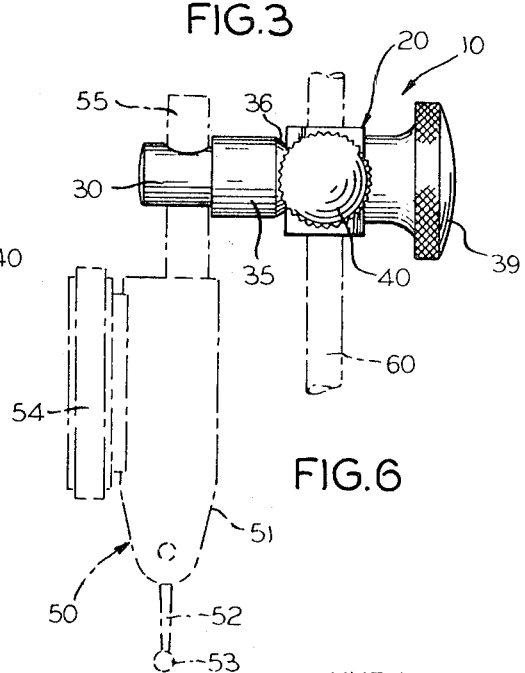
FIG.6
INVENTOR
CHARLES A. USISKIN

3,581,354
INSTRUMENT CLAMP
Charles A. Usiskin, Chicago, Ill., assignor to Enco Manufacturing Company, Chicago, Ill.
Filed Sept. 16, 1969, Ser. No. 858,461
Int. Cl. A44b *21/00*
U.S. Cl. 24—81H
7 Claims

ABSTRACT OF THE DISCLOSURE

The invention is directed to a clamp used for mounting an instrument such as a dial indicator or a test indicator on a support stand. The clamp is so constructed that a test indicator having one or more different types and sizes of mounting means can readily be accommodated as can various sizes and types of support stands.

BACKGROUND OF THE INVENTION

Test indicators are used for various purposes such as measuring the flatness of a surface. In order to make such a measurement, the indicator is mounted on a stand that carries an upstanding support rod. The mounting of the test indicator which may have any one of a number of types and sizes of mounting means, is effected by the use of an instrument clamp. For example, the test indicator may include a projecting round post having one of a variety of diameters and/or a dovetail-shaped tenon. Also, the upstanding rod carried by a stand used to support the test indicator may have any one of a number of diameters.

In the past, mounting clamps that have been available on the market have not been universal in the sense that they could not accommodate all of the various sizes and types of mounting means on the instrument and the various sizes of support rods and types of stands.

It is therefore an important object of this invention to provide an instrument clamp that is truly universal, that is, it can be used to mount on a stand a test indicator having a variety of sizes and types of mounting means.

Another object in connection with the foregoing object is to provide the clamp with adjustable openings to receive respectively instrument parts and upstanding support rods of various sizes.

Yet another object of this invention is to provide an instrument mounting clamp which can be loosened and tightened with ease, yet providing secure connections between the instrument, the clamp and the support rod.

With the foregoing and other objects in view which will appear as the description proceeds, the invention consists of certain novel features and construction, arrangement, and a combination of parts hereinafter fully described, illustrated in the accompanying drawings and particularly pointed out in the appended claims, it being understood that various changes in the form, proportions, size and minor details of the structure and the method may be made without departing from the spirit or sacrificing any of the advantages of the invention.

BRIEF DESCRIPTION OF THE DRAWINGS

For the purpose of facilitating an understanding of the invention, there has been illustrated in the accompanying drawings a preferred embodiment thereof, from an inspection of which, and considered in connection with the following description, the invention's mode of construction, operation, and many of its advantages should be readily understood and appreciated.

Referring to the drawings in which the same characters of reference are employed to indicate corresponding or similar parts throughout the several figures of the drawings:

FIG. 1 is a plan view of an instrument clamp embodying the principles of the present invention;

FIG. 2 is a side elevational view of the instrument clamp;

FIG. 3 is a sectional view taken on the plane of line 3—3 of FIG. 2 of the drawing and viewed in the direction indicated;

FIG. 4 is a plan view of the instrument clamp in its tightened condition and showing in phantom a test indicator and a support rod;

FIG. 5 is a front elevational view of the instrument clamp with the test indicator and the support rod being shown in phantom; and FIG. 6 is a side elevational view of the test instrument clamp illustrating another type of mounting means on the test indicator which is shown in phantom.

DESCRIPTION OF THE PREFERRED EMBODIMENT

Referring now to the drawings, and more particularly to FIGS. 1 to 3 thereof, there is shown an instrument clamp 10 including a block-shaped body 20 having a first opening or bore 21 extending therethrough, the bore 21 having an annular portion 22 and a V-shaped portion 23. There is provided a threaded aperture 24 communicating with the bore 21 at the annular portion 22 thereof, with the longitudinal axis of the threaded aperture 24 substantially bisecting the angle formed by the V-shaped portion 23. The body 20 further has a dovetail-shaped mortise 25 extending therethrough and spaced from the bore 21, it being noted that the longitudinal axis of the mortise 25 is disposed generally parallel to the longitudinal axis of the bore 21. Extending through the body 20 is a slit 26 that communicates both with the bore 21 at the apex of the V-shaped portion 23 thereof and with the mortise 25. The slit 26 actually divides the body 20 into two arms 27 and separates the mortise 25 into parts. There is also provided a second opening 26a adjoined to the mortise 25. Disposed in one of the arms 27 is an opening 28 and in the other arm is an opening 29 that flairs outwardly.

The instrument clamp 10 further includes a cylinder 30 having a second opening 31 extending transversely therethrough. There is provided a threaded shaft 32 on the cylinder 30 and extending axially outwardly therefrom. There is also provided a cylindrical collar 35 having a chamfered end 36 that is adapted to fit within the flaired opening 29. The chamfered end 36 has passing therethrough an opening 38, and, in the periphery of the other end of the collar 35 is a pair of diametrically-opposed V-shaped notches 37. The cylinder 30 is slidably disposed in the cylindrical collar 35 and is so positioned that the notches 37 are longitudinally aligned with the opening 31 as is seen most clearly in FIG. 1. The threaded shaft 32 extends slidably through the opening 38 in the collar 35, through the flaired opening 29 in one of the arms 27 and through the opening 28 in the other of the arms 27. There is provided a thumb nut 39 thereby engaging the shaft 32. Finally, there may be provided a thumbscrew 40 having a threaded shank 41 threadably engaging in the aperture 24 in the body 20.

The instrument clamp 10 is specifically adapted to mount an instrument, such as a test indicator 50, on a stand that may include a support post or rod 60. The test indicator 50 includes a body 51 having a probe 52 which carries on the end thereof a ball point 53. There is provided a dial 54 and a projecting post 55 (see FIG. 6) and/or a dovetail-shaped tenon 56 (see FIG. 5). It is to be understood that the support rod 60 will usually be carried by a stand or the like. After the test indicator 50 is mounted on the support rod 60, it can be used for any number of purposes, such as measuring the flatness of a surface. In that regard, the test indicator 50 is so positioned that the ball point 53 rests upon the surface to be measured. As the test indicator 50 is moved along the surface being tested, the dial 54 indicates variations in the flatness of that surface.

In one use of the indicator clamp 10, the thumbscrew 40 is first loosened to the position shown in FIG. 1 to accommodate receipt of the support rod 60 through the bore 21 as shown in FIG. 4. When the clamp 10 reaches the desired point along the extent of the support rod 60, the thumbscrew 40 is tightened so that the support rod 60 is contacted essentially at three points, one point being the end of the threaded shank 41 and the other two points being on the sides of the V-shaped portion 23, thus securely to connect the instrument clamp 10 to the support rod 60. It is readily apparent that the shaft 41 of the thumbscrew 40 is movable between a position wherein the size of the bore 21 is very small and a position wherein the size of the bore 21 is much larger, so that the bore 21 can accommodate a variety of diameters of support rods 60. The V-shaped portion 23 serves to center the support rod 60 and to increase the ability of the instrument clamp 10 to hold the same. It is, of course, clear that the instrument clamp 10 may be moved along the extent of the support rod 60 very easily and rapidly by loosening the thumbscrew 40 and repositioning the instrument clamp or removing it entirely if that is desired.

If the test indicator 50 is of the type shown in FIGS. 4 and 5, that is, if it has a dovetail-shaped tenon 56, the tenon 56 is slid into the dovetail-shaped mortise 25. The thumb nut 39 is then tightened which draws the cylinder 30 into the cylindrical collar 35 which, in turn, will move until the chamfered end 36 engages the sides of the flaired opening 29, whereupon the arms 27 of the body will draw together to tend to reduce the width of the dovetail-shaped mortise 25 thereby to interconnect the test indicator 50 and the instrument clamp 10.

On the other hand, if the test indicator 50 has the type of mounting means shown in FIG. 6, that is, a projecting post 55, then the thumbscrew 39 is first loosened so that the cylinder 30 is withdrawn, to some extent, from the cylindrical collar 35, to the position shown in FIG. 1. The projecting post on the test indicator 50 is inserted through the opening 31 to the position shown in FIG. 6. The thumbscrew 39 is then tightened to draw the cylinder 30 into the cylindrical collar 35 until the sides of the V-shaped notches 37 on the collar 35 engage the projecting post 55. Continued rotation of the thumbscrew 39 causes the cylinder 30 to draw the post 55 against the sides of the notches 37, thereby securely to interconnect the test indicator 50 and the indicator clamp 10. Again the V-shaped notches 37 serve to center the post 55 and increase the holding power of the clamp 10.

As is the case with the bore 21, the effective size of the opening 31 in the cylinder 30 is adjustable, by the action of the collar 35, from a very small size, even zero if desired to a rather large size so that the opening 31 can accommodate rods 60 or posts 55 of various sizes. The test indicator 50 may have both a projecting post 55 and the dovetail-shaped tenon 56, in which case the part selected to be connected to the clamp 10 is the one which will place the test indicator 50 in the desired orientation. In certain cases, the thumbscrew 40 would not even be necessary. For example, if the projecting post 55 on the test indicator 50 were used, tightening of the thumb nut 39 will draw the post 55 against the sides of the V-shaped notches 37 until the instrument clamp 10 is secured in place, whereupon continued tightening of the thumb nut 39 will draw the arms 27 together and thereby secure the instrument clamp 10 to the support rod 60.

Depending upon the circumstances, it may be desired to use the opening 31 in the cylinder 30 to receive the support rod 60 and use the bore 21 (or the smaller opening 26a) in the body 20 to receive the projecting post 55 on the test indicator 50. Also the size of the bore 21 may be different than the size of the opening 31, whereby the one to be used would depend upon the diameter of the post 55 and the diameter of the support rod 60.

It can be seen that the instrument clamp 10 described is quite versatile. The instrument clamp 10 can be used in such a manner that it is held securely on the support rod 60 by use of the thumbscrew 40 whether or not the test indicator 50 is in the process of being attached. There are other times and conditions when it is desired that loosening of the thumb nut 39 will effect disconnection of the instrument camp 10 from both the support rod 60 and from the test indicator 50 which is accomplished by either of the arrangements of FIG. 5 or FIG. 6 (but with the thumbscrew 40 loosened).

Sometimes an indicator has a lug (not shown) with a hole therein, instead of, or in addition to, the post 55 and the tenon 56. In that case, an adapter is usually provided which is inserted through that hole and is attached to the indicator. The adaptor has a protruding post that has the same effect and purpose as the post 55.

It is important to note that both the size of the bore 21 and the effective size of the opening 31 are adjustable so that different diameter support rods 60 and different diameter posts 55 can be accommodated. In the past, this was not the case because the openings in available clamps were fixed in size.

It is believed that the invention, its mode of construction and assembly and many of its advantages should be readily understood from the foregoing without further description, and that it should also be manifest that, while the preferred embodiment of the invention has been shown and described for illustrative purposes, the structural details are, nevertheless, capable of a wide variation within the purview of the invention as defined in the appended claims.

What I claim and desire to procure by Letters Patent of the United States is:

1. An instrument clamp for mounting on a support post an instrument that carries a projecting post, said clamp comprising:
   a first portion having a first opening therein for selectively receiving one of the posts;
   a second portion having a second opening therein for selectively receiving the other one of the posts,
   a third portion having a dovetail-shaped mortise extending therethrough for receiving a dovetail-shaped tenon on the associated instrument,
   means operatively connected to said portions for adjusting the size of both of said openings by substantial amounts and for adjusting the size of said mortise,
   whereby said clamp is operative to mount an instrument carrying a post that may have diverse sizes to a support post that may have diverse sizes.

2. The instrument clamp set forth in claim 1, wherein:
   said means includes a first part for simultaneously adjusting the size of said first opening and the size of said mortise, and a second part for independently adjusting the size of said second opening.

3. The instrument clamp set forth in claim 1 wherein:
   said second portion has a threaded aperture therein communicating with said second opening, and
   said means includes a thumbscrew engaging in said threaded aperture for securing the post in said second opening independently of whether the post in the other opening is secured.

4. The instrument clamp set forth in claim 3, wherein:
   said second opening has a V-shaped portion with its angle being substantially bisected by the longitudinal axis of said aperture, whereby tightening of said thumbscrew urges the part in said second opening against the sides of said V-shaped portion.

5. The instrument clamp set forth in claim 1, wherein:
   each of said openings has a V-shaped portion for centering the part disposed therein and for increasing the holding power thereof.

6. An instrument clamp for mounting on a support post an instrument that carries a projecting post, said clamp comprising:
- a first portion having a first opening therein for selectively receiving one of the posts,
- said first portion including a cylinder having said first opening extending transversely therethrough and carrying a threaded shank extending axially outwardly therefrom;
- a second portion having a second opening therein for selectively receiving the other one of the posts,
- means operatively connected to said portions for adjusting the size of both of said openings by substantial amounts,
- said means including a cylindrical collar slidably receiving said cylinder and a thumb nut engaging said shaft, tightening said nut on said shaft causing said cylinder to draw the post passing through said first opening against said collar securely to interconnect said clamp to the last-mentioned post,
- whereby said clamp is operative to mount an instrument carrying a post that may have diverse sizes to a support post that may have diverse sizes.

7. The instrument clamp set forth in claim 6, wherein: said cylindrical collar has in the periphery of one end thereof a pair of diametrically-opposed V-shaped notches, said collar being positioned on said cylinder to align said notches with said first opening so that tightening of said nut draws the post passing through said first opening against the sides of said notches.

References Cited

UNITED STATES PATENTS

| | | | |
|---|---|---|---|
| 2,212,156 | 8/1940 | Erdley | 24—81LC |
| 2,267,583 | 12/1941 | Carroll | 24—81HX |
| 2,365,935 | 12/1944 | Boggs | 248—229 |
| 3,254,386 | 6/1966 | McBrien | 24—81LCX |
| 3,424,420 | 1/1969 | Seiderman | 248—229 |

FOREIGN PATENTS

| | | | |
|---|---|---|---|
| 544,163 | 6/1956 | Italy | 248—229 |

DONALD A. GRIFFIN, Primary Examiner

U.S. Cl. X.R.

248—229